Nov. 4, 1952 A. M. McCULLOCH 2,616,567
RACK FOR PLATES AND OTHER DISK-LIKE OBJECTS
Filed May 7, 1949
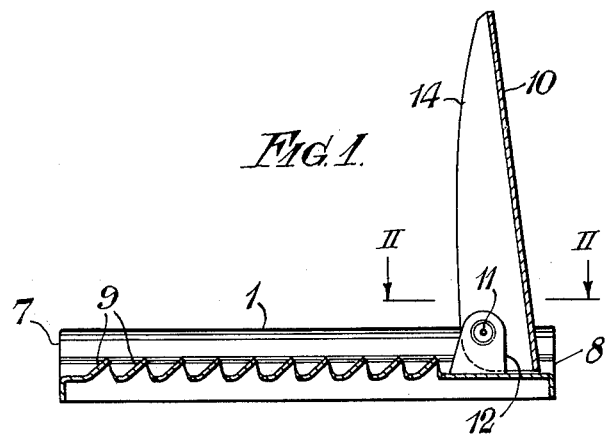
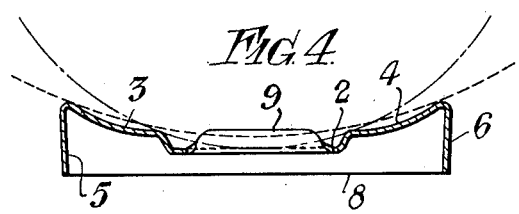
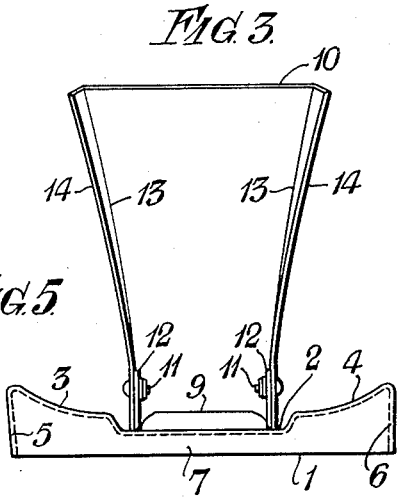
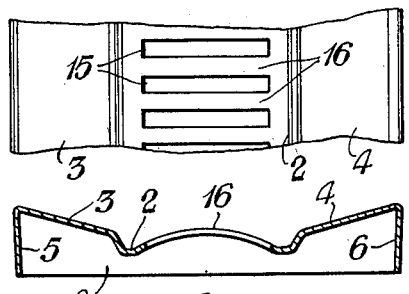
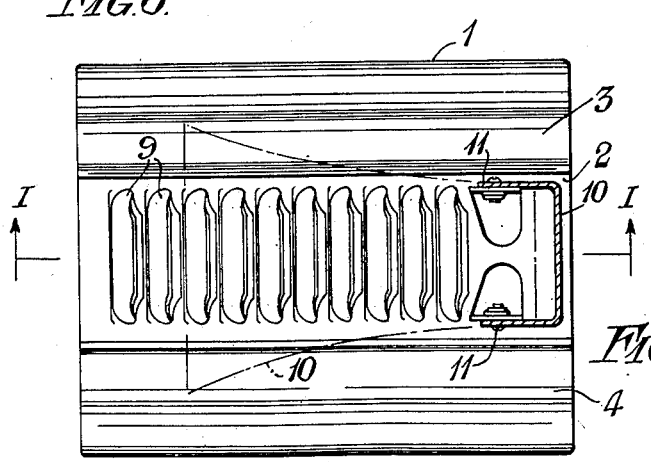
INVENTOR:
ALBERT MALCOLM McCULLOCH
By: Haseltine, Lake & Co.
AGENTS Patented Nov. 4, 1952

2,616,567

UNITED STATES PATENT OFFICE 2,616,567

RACK FOR PLATES AND OTHER DISK-LIKE OBJECTS

Albert Malcolm McCulloch, London, England

Application May 7, 1949, Serial No. 91,946
In Great Britain March 11, 1949

3 Claims. (Cl. 211—41)

The invention relates to racks for plates and other disc-like objects, such racks being also referred to hereinafter as racks of the type specified.

The invention is particularly, but not exclusively, concerned with a rack whereon dinner plates and the like may be placed for draining and drying after washing. In the specification, however, the disc-like objects will be referred to generally as "plates" without implied limitation to any one particular kind.

An object of the invention is to provide a rack capable of receiving and holding in a stable position a comparatively large number of plates of various sizes within a small space.

A further object is to provide a rack wherein the weight of the plates assists in stabilizing the assembly of rack and plates.

A further object is to provide a rack having a minimum number of parts which may be easily manufactured by repetition pressing or moulding operations.

An example of the rack according to the invention will now be described in more detail with reference to the accompanying drawing.

Figure 1 is a side elevation of a plate rack in longitudinal section.

Figure 2 is a plan of Figure 1, partly in section.

Figure 3 is an end elevation viewed from the left of Figure 1.

Figure 4 is a cross-section of the rack shown in Figures 1 to 3, the chain lines indicating plates of different diameters resting on the rack.

Figures 5 and 6 are a part plan and cross-section respectively of a modification.

Referring to Figures 1 to 4, the rack comprises a base indicated generally by 1 and consisting of a single rectangular sheet of metal pressed to the cross-section shown in Figure 4. A central channel 2 is flanked on either side by curved supporting surfaces 3, 4, these surfaces sloping upwardly from the top sides of the channel and running into substantially vertical downwardly directed bounding edges 5, 6, which, together with similar edges 7, 8, at back and front, permit the rack to stand firmly on a plane surface. The edges 5, 6 and 7, 8 extend downwardly slightly beyond the base of the channel 2, so that when the rack is placed upon a plane supporting surface, the base of the channel will be held clear of said supporting surface. The curved surfaces 3, 4 conform in cross-section substantially to part of the circumference of a circle which is common to both of said curved surfaces. The width of each surface 3 approximates to one-sixteenth of the circumference of the circle forming said common circular arc.

Axially spaced along the length of the channel are a series of louvres 9, each adapted to receive the edge or edges of one or more plates. The louvres are formed by making a series of cuts in parallel spaced relationship along the channel and then upsetting the intervening tongues of metal. Such operations may be performed respectively by the use of a cutting and stamping die in a power press.

If plates are inserted edgewise in the said louvres, the edges of the plates will rest on the side supporting surfaces 3, 4 and will make contact therewith at points symmetrically spaced on either side of the channel as shown in chain lines in Figure 4. Furthermore, the lowest portion of the plate edges will lie below the top edges of the louvres 9, which therefore serve to stabilize the plates in the axial direction of the channel, whilst the points of contact with the supporting surfaces 3, 4, serve to stabilize the plates transversely of the axis. The lower edges of the plates will also be supported above the plane surface upon which the rack is placed.

Whilst it would be possible for plates of small diameter to be supported individually in the rack in this way, it is desirable, however, to provide additional support in the axial direction, particularly when large or heavy plates, or a stack of large and small plates, are to be placed on the rack. Such additional support is provided by a pillar 10 pivoted at 11 to sheet metal lugs 12 stamped from the centre of the channel and bent vertically upwards.

As shown in Figure 3, the base of the pillar is narrower than the channel so that when folded down, as shown in chain lines in Figure 4, the base of the pillar lies within the channel. This construction of the pillar permits the use of a single oblong flat sheet of metal for forming the pillar, the said sheet being bent along the curves 13 to form two side cheeks 14, the wider lower portions of which receive the pivots 11. The pillar is thus of channeled formation the depth of which decreases from the lower part of the pillar towards the upper part thereof, with a corresponding progressive increase in the width of the pillar.

When in use the plates are stacked either singly or together so as to be supported partly by the pillar 10. Since the weight of the plates must always act through a line to the left of the pivots 11 in Figure 1, the stability of the assembly increases as the load is increased, even if the rack is not quite horizontal.

Effective drainage is provided by the sloping side supports 3, 4, and the central channel.

Furthermore, by virtue of the additional stability provided by the pillar 10, the rack, with the load thereon, may be transferred from place to place without breakage.

Figures 5 and 6, show a modification in which the portions of the channel adapted to receive the plate edges are in the form of rectangular slots 15, formed between upwardly curved strips 16. A further modification shown here consists in making the side supports 3, 4, plane instead of curved.

In either of the constructions above described, the lower edges of the plates lie in the louvres or the slots, whilst the upper edges rest against each other and against the extreme right-hand plate, which rests against the pillar 10.

The rack, except the pivots 11, may also be manufactured entirely in plastic.

I claim:

1. A rack of the type specified comprising a base plate produced from a single blank of sheet metal, a central channel formed in and extending longitudinally of said base plate, a series of transversely extending disc-edge-receiving portions formed in said channel and spaced along the length thereof, a pair of transversely spaced lugs disposed at one end of the channel and set up from the base of said channel, a channel shaped support pillar pivotally mounted adjacent its lower end upon said lugs, said supporting pillar having at its lower part a width less than that of the central channel to permit the pillar to be folded down onto said base plate, upwardly and outwardly extending disc-supporting surfaces contiguous with and symmetrically flanking said central channel, and downwardly directed side walls depending from the outer long edge portions of the disc-supporting surfaces, said side walls extending downwardly beyond the base of the said central channel, so that when disc-like objects are placed edgewise in the disc-receiving portions, the lower edges of such objects will contact on either side of the central channel with the disc-supporting surfaces.

2. A rack of the type specified, comprising a base plate formed from a single oblong substantially rectangular blank of sheet metal and having a central straight channel formed in and extending longitudinally of the base plate, a series of transversely extending disc-edge-receiving louvres formed in said channel and spaced along the length thereof, a pair of transversely spaced lugs disposed at one end of the channel and set up from the base of said channel, upwardly and outwardly extending curved disc-supporting surfaces contiguous with and symmetrically flanking said central channel, and downwardly directed side walls depending from the outer long edge portions of the disc-supporting surfaces, said side walls extending downwardly beyond the base of the central channel, and further comprising a channel-shaped support member formed from a single oblong substantially rectangular blank of sheet metal, means at the lower end of said support member for pivotally connecting said member to the lugs of said base plate, said support member having at its pivoted end a width less than that of the central channel to permit the support member to be folded down onto the base plate, and the side flanges of the support member being of greatest depth at the pivoted end and said flanges gradually decreasing in depth towards the free end of the member with a corresponding progressive increase in the width of the member, said support member, when in its upright position, supporting the upper ends of disc-shaped objects placed in the rack.

3. A rack of the type specified, comprising a base plate formed from a single oblong substantially rectangular blank of sheet metal, and having a central channel extending longitudinally of the base plate, curved disc-supporting surfaces extending upwardly and outwardly symmetrically on either side of said channel, each of said surfaces conforming in cross-section to a circular arc common to both of said surfaces, the width of each curved supporting surface approximating to one-sixteenth part of the circumference of the circle forming said common arc, side walls connected to said surfaces, said side walls extending downwardly beyond the base of the central channel, a series of transverse louvres set up from the base of said central channel, said louvres being spaced along the length of the channel, a pair of lugs set up from the base of said central channel adjacent one end thereof, a channel-shaped support member formed from a single substantially rectangular blank of sheet metal and pivotally connected to said lugs, the width of said member at its pivoted end being less than the width of the central channel in the base plate to permit said member to be folded down onto said plate, and the depth of said channel-shaped member being greatest at the pivoted end thereof and gradually decreasing in depth toward the opposite end with a corresponding progressive increase in the width of the member, said member when in a substantially upright position being adapted to support the upper edges of disc-like objects placed in the rack, the lower edges of such objects being located between said louvres and contacting points symmetrically spaced on the curved supporting surfaces.

ALBERT MALCOLM McCULLOCH.

REFERENCES CITED

The following references are of record in the file of this patent:

UNITED STATES PATENTS

| Number | Name | Date |
| --- | --- | --- |
| 477,545 | Howell | June 21, 1892 |
| 1,348,792 | Feingold | Aug. 3, 1920 |
| 1,568,690 | Parsons | Jan. 5, 1926 |
| 1,714,629 | Rodin | May 28, 1929 |
| 1,759,862 | Moore | May 27, 1930 |

FOREIGN PATENTS

| Number | Country | Date |
| --- | --- | --- |
| 18,879 | Great Britain | 1909 |
| 118,912 | Sweden | May 27, 1947 |
| 379,520 | Great Britain | Sept. 1, 1932 |
| 446,807 | Great Britain | May 6, 1936 |
| 556,633 | Great Britain | Oct. 13, 1943 |
| 591,552 | Great Britain | Aug. 21, 1947 |